United States Patent [19]

Yoshigi et al.

[11] Patent Number: 5,729,436
[45] Date of Patent: Mar. 17, 1998

[54] WIRING BOARD FOR ELECTRICAL CONNECTION

[75] Inventors: Toshimasa Yoshigi; Toshiharu Kawashima; Takayoshi Endo, all of Shizuoka-ken, Japan

[73] Assignee: Yazaki Corporation, Tokyo, Japan

[21] Appl. No.: 698,248

[22] Filed: Aug. 15, 1996

[30] Foreign Application Priority Data

Aug. 16, 1995 [JP] Japan .................... 7-208736
Feb. 20, 1996 [JP] Japan .................... 8-032344

[51] Int. Cl.⁶ .................... H05K 5/02; H01R 9/03
[52] U.S. Cl. .................... 361/752; 439/76.2
[58] Field of Search .................... 361/752, 826; 174/59; 439/76.1, 76.2, 246, 252, 547, 554, 404, 949

[56] References Cited

U.S. PATENT DOCUMENTS

| | | | |
|---|---|---|---|
| 4,560,226 | 12/1985 | Dennis | 439/404 |
| 4,894,018 | 1/1990 | Phillips et al. | 439/81 |
| 4,963,099 | 10/1990 | Sato et al. | 439/76.2 |
| 5,067,905 | 11/1991 | Matsumoto et al. | 439/76.2 |
| 5,416,972 | 5/1995 | Sugiura et al. | 439/76.2 |
| 5,482,362 | 1/1996 | Robinson | 439/76.1 |
| 5,509,812 | 4/1996 | Comerci et al. | 439/76.1 |

FOREIGN PATENT DOCUMENTS 5-30037  5/1993  Japan .................... H01R 23/68

*Primary Examiner*—Leo P. Picard
*Assistant Examiner*—John B. Vigushin
*Attorney, Agent, or Firm*—Finnegan, henderson, Farabow, Garrett & Dunner, L.L.P.

[57] ABSTRACT

A wiring board for electrical connection includes a base plate having a plurality of recessed portions, a cover for covering the surface of the base plate, a plurality of female terminals, each being received in the corresponding recessed portion of the base plate, and a plurality of electric wires. The female terminal includes a bent substrate having an L-shaped cross-section, a wire compressively contacting portion formed on the outer surface of one side portion of the substrate, and a terminal engaging portion formed on the outer surface of the other side portion of the substrate for receiving therein a tab terminal so as to be substantially perpendicular to the base plate. The terminal engaging portion is received in the recessed portion while ensuring predetermined clearances between the outer surface of the engaging portion and the side walls of the recessed portion. The base plate is covered by the cover while receiving the electric wire in a guide groove formed in the base plate.

11 Claims, 7 Drawing Sheets

WIRING BOARD FOR ELECTRICAL CONNECTION

BACKGROUND OF THE INVENTION

1. Field of the Invention

The present invention relates to a wiring board for electrical connection. More specifically, the invention relates to a wiring board for electrical connection, for example, which is used, in a casing of an automatic transmission for an automotive vehicle, for electrically connecting terminals of solenoid valves for oil pressure control to a wire harness drawn out of the casing.

2. Description of the Related Art

In a typical automatic transmission for an automotive vehicle, solenoid valves of an oil pressure control system are arranged so as to be dispersed in an oil pan provided at the bottom of a transmission casing, and to be immersed in a working fluid. In order to connect the terminals of the solenoid valves to a wire harness drawn out of the casing, a wiring board for electrical connection is used.

Japanese Patent Publication No. 5-30037 discloses a wiring board (an electrical connector) for electrical connection of this type. In this wiring board, a bus bar (a metal bus-bar strip) for circuit constitution is provided in a gap between a base plate and a cover. A female terminal is formed in the bus bar in position by punching, and pin terminals of solenoid valves are received in the female terminal.

In the aforementioned conventional wiring board, an internal circuit is formed by the bus bar formed by the press molding, and the female terminal is simultaneously formed by punching. Therefore, there are problems in that it is difficult to enhance the dimensional accuracy of the female terminal and to form a movable structure for absorbing the deviation from the mating terminal, so that the conventional wiring board lacks for flexibility.

SUMMARY OF THE INVENTION

It is therefore an object of the present invention to eliminate the aforementioned problems and to provide a wiring board for electrical connection which can precisely manufactured and which can absorb the deviation from a tab terminal.

In order to accomplish the aforementioned and other objects, according to one aspect of the present invention, a wiring board for electrical connection, comprises: a base plate of an insulating material, the base plate being formed with a plurality of recessed portions; a cover for covering a surface of the base plate; a plurality of female terminals, each being received in the corresponding recessed portion of the base plate while being permitted to move in the recessed portion in directions of a major plane of the base plate; and a plurality of circuit members provided between the base plate and the cover, each of the circuit members electrically connecting one female terminal to another female terminal via a flexible conductor.

In this wiring board, since the female terminal is formed independent of the circuit member, which forms the internal circuit, to be connected to the circuit member via the flexible conductor, it is possible to enhance the dimensional accuracy of the female terminal by manufacturing the female terminal independent of the circuit member. In addition, since the female terminal can move in the recessed portion when a tab terminal is inserted into the female terminal, it is possible to absorb the deviation of the tab terminal from the axis of the female terminal.

Each of the circuit members may be an electric wire, and the conductor may a part of the electric wire. In this case, since the circuit member is an electric wire, it is possible to easily cope with the design change of the internal circuit. In addition, since no bus bar is used for wiring, it is possible to make good use of the press-molded material and to decrease the cost.

The female terminal may comprise a bent substrate having a L-shaped cross-section, a wire compressively contacting portion which is formed on an outer surface of one side portion of the substrate and to which an end portion of the electric wire is compressively connected, and a terminal engaging portion formed on an outer surface of the other side portion of the substrate for receiving therein a tab terminal so as to be substantially perpendicular to the base plate, the terminal engaging portion being received in the recessed portion while ensuring predetermined clearances between the outer surface of the terminal engaging portion and the side walls of the recessed portion, and the base plate being covered by the cover while receiving the electric wire in a guide groove formed in the base plate. In this case, since the electric wire compressively contacts the independent female terminal so as to electrically connect the female terminal to another female terminal, it is possible to easily cope with the design change of the circuit. In addition, since the female terminal can move in the recessed portion when the tab terminal is inserted into the terminal engaging portion of the female terminal, it is possible to absorb the deviation of the tab terminal from the female terminal. In particular, since the side walls of the recessed portion prevent the terminal engaging portion from moving beyond a predetermined range, it is possible to hold the terminal engaging portion at a position at which the tab terminal can surely received in the terminal engaging portion. In addition, since the terminal engaging portion is provided on the other side portion of the L-shaped substrate, it is possible to ensure a sufficient large depth for receiving the tab terminal with respect to the recessed portion, and the terminal engaging portion can be surely located in a given range while ensuring a necessary and sufficient clearance between the terminal engaging portion and the recessed portion.

The guide groove may have a width greater than of a diameter of the electric wire so that the electric wire can move in the guide groove in accordance with the movement of the female terminal.

The circuit member may be a bus bar, and the conductor may be a bonding wire which has a spring characteristic and which is bridged between the bus bar and the female terminal. In this case, the female terminal is manufactured independent of the bus bar, and the female terminal is connected to the bus bar via the bonding wire having the spring characteristic. Therefore, it is possible to enhance the dimensional accuracy of the female terminal. In addition, since the female terminal can move by the elasticity of the bonding wire when the tab terminal is inserted into the female terminal, it is possible to absorb the deviation of the tab terminal from the female terminal. In addition, since the female terminal can be held in position by the elasticity of the bonding wire, it is possible to decrease the movement of the female terminal before the tab terminal engages the female terminal, so as to easily insert the tab terminal into the female terminal.

The circuit member may comprise a thin film circuit pattern formed on the base plate, and the conductor may be a bonding wire which has a spring characteristic and which is bridged between the circuit pattern and the female terminal. In this case, since the circuit member comprises a thin film circuit pattern, it is possible to minimize the gap between the base plate and the cover.

The female terminal may comprise a bent substrate having a L-shaped cross-section, a wire bonding portion which is formed on an outer surface of one side portion of the substrate and to which an end portion of the bonding wire is connected, and a terminal engaging portion formed on an outer surface of the other side portion of the substrate for receiving therein a tab terminal so as to be substantially perpendicular to the base plate, the terminal engaging portion being received in the recessed portion while ensuring predetermined clearances between the outer surface of the engaging portion and the side walls of the recessed portion. In this case, since the circuit member is connected to the female terminal via the bonding wire, the female terminal can move in the recessed portion when the tab terminal is inserted into the terminal engaging portion of the female terminal, so as to absorb the deviation of the tab terminal from the female terminal. In particular, since the side walls of the recessed portion prevent the terminal engaging portion from moving beyond a predetermined range, it is possible to hold the terminal engaging portion at a position at which the tab terminal can surely received in the terminal engaging portion. In addition, since the terminal engaging portion is provided on the other side portion of the L-shaped substrate, it is possible to ensure a sufficient large depth for receiving the tab terminal with respect to the recessed portion, and the terminal engaging portion can be surely located in a given range while ensuring a necessary and sufficient clearance between the terminal engaging portion and the recessed portion.

The base plate may have a supporting wall for supporting thereon the terminal engaging portion received in the recessed portion. In this case, if the terminal engaging portion moves when the tab terminal is inserted therein, the terminal engaging portion is supported on the supporting wall, so that the tab terminal can be easily inserted therein.

BRIEF DESCRIPTION OF THE DRAWINGS

The present invention will be understood more fully from the detailed description given herebelow and from the accompanying drawings of the preferred embodiment of the invention. However, the drawings are not intended to imply limitation of the invention to this specific embodiment, but are for explanation and understanding only.

In the drawings.

DESCRIPTION OF THE PREFERRED EMBODIMENT

Figure 1:
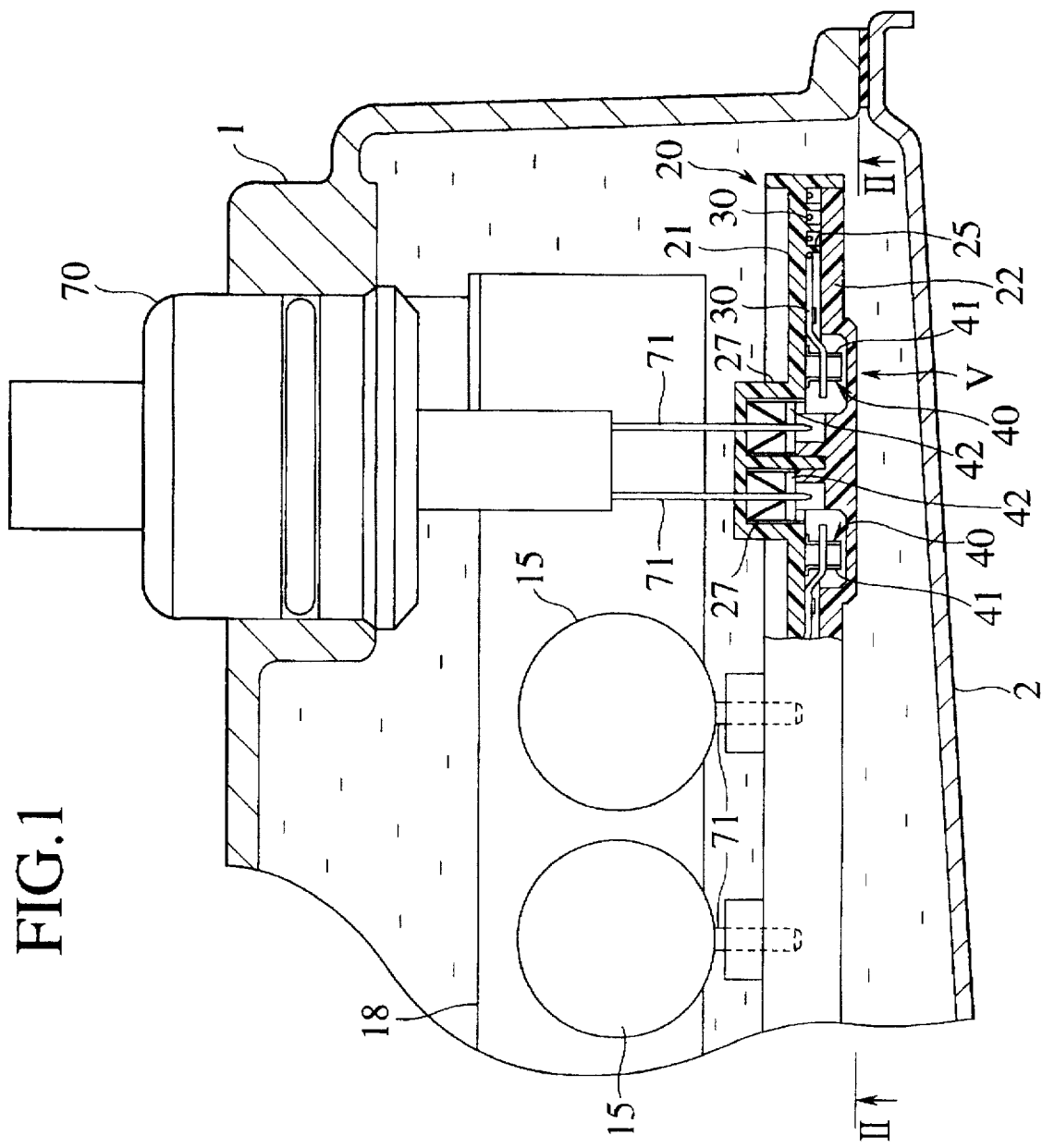
FIG. 1 is a sectional view illustrating the working condition of the first preferred embodiment of a wiring board for electrical connection according to the present invention.

Referring now to the drawings, particularly to FIGS. 1 through 7, the first preferred embodiment of a wiring board for electrical connection, according to the present invention, will be described below.

Figure 2:
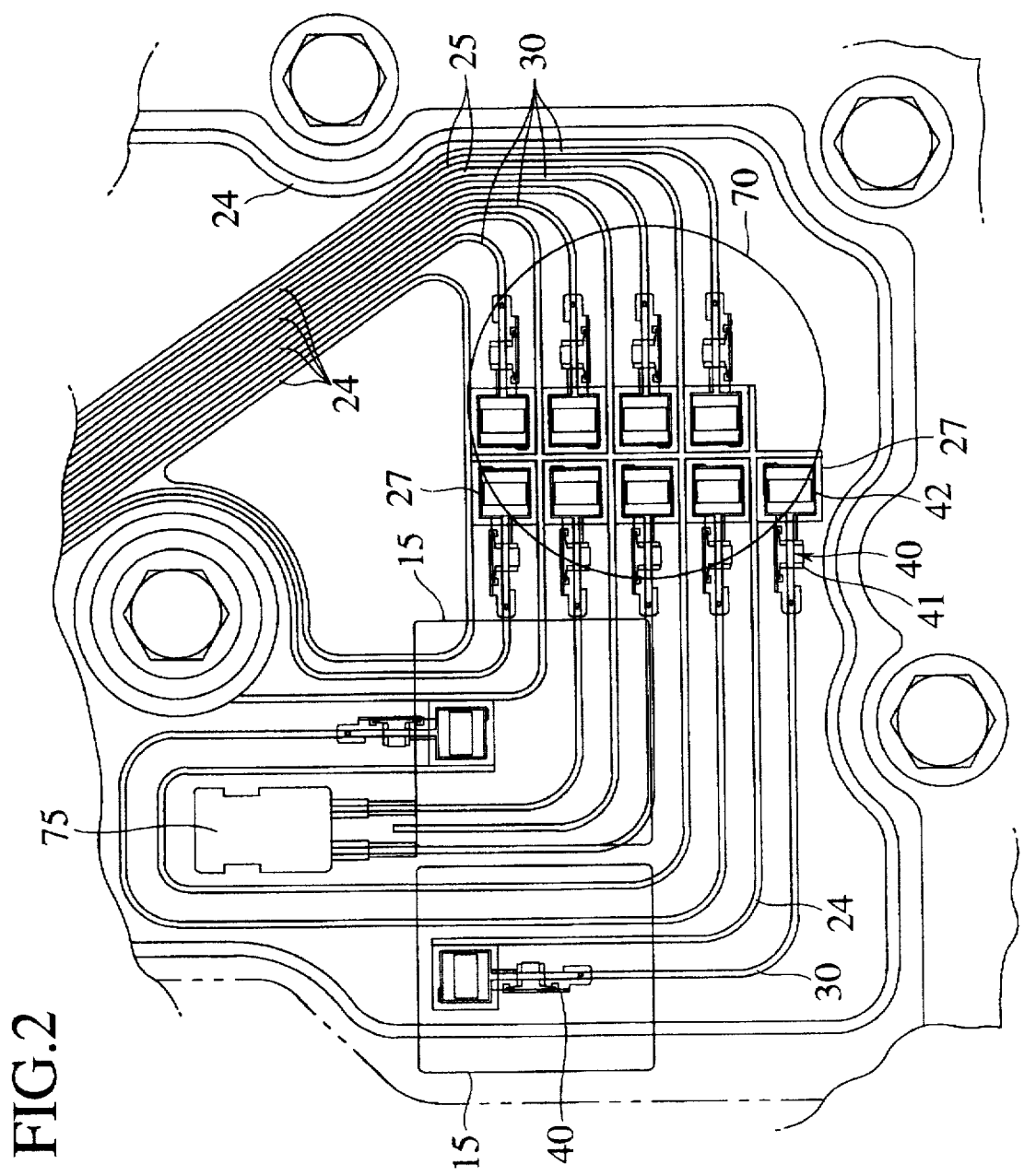
FIG. 2 is a plan view of the wiring board viewed from arrow II—II of FIG. 1 when a cover is removed.
Figure 3:
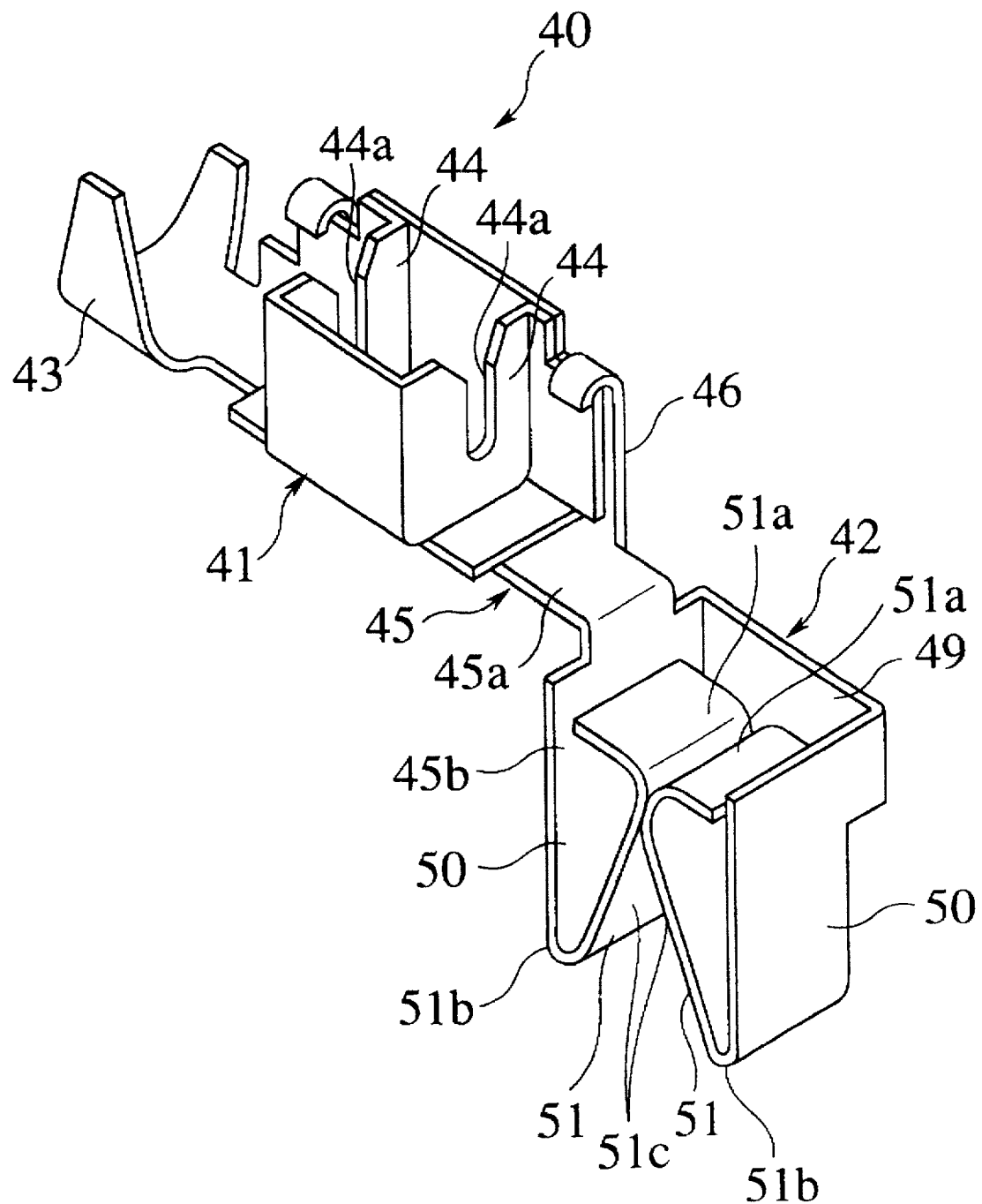
FIG. 3 is a perspective view of a female terminal used for the first preferred embodiment of a wiring board according to the present invention.

FIG. 1 is a sectional view illustrating the working condition of the first preferred embodiment of a wiring board 20 for electrical connection, according to the present invention. FIG. 2 is a plan view of the wiring board viewed from arrow II—II of FIG. 1 when a cover is removed.

The wiring board 20 for electrical connection is received in a lower space of an automatic transmission which includes an automatic-transmission casing 1 and an oil pan 2, and the wiring board 20 is immersed in a hydraulic fluid. The casing 1 receives therein a valve body 18 and solenoids 15. In addition, a connector 70 (which is expressed by a thin line in FIG. 2) arranged at the end of a wire harness is designed to be connected to female terminals 40 in the automatic transmission when tab terminals 71 are received in terminal engaging portions 42 of the wiring board 20 so as to be perpendicular to the wiring board 20. Furthermore, the reference number 75 in FIG. 2 denotes an oil temperature sensor.

The wiring board 20 comprises a base plate 21 of an insulating material, a cover 22 for covering the lower surface of the base place, solid copper wires (electric wires) 30 serving as circuit members for forming an internal circuit, and female terminals 40 facing the solenoids 15 and the connector 70. Each of the female terminals 40 has a wire compressively contacting portion 41 which compressively contacts the solid copper wire 30, and a terminal engaging portion 42 for receiving and engaging the tab terminal 71 which is received in the base plate 21 so as to be perpendicular thereto. The base plate 21 is covered by the cover 22 after the cover wires 30 are received in guide grooves 25 formed in the lower surface of the base plate 21.

The guide groove 25 is formed between ribs 24 so as to guide the solid copper wire 30 along a predetermined route. The minimum width of the guide groove 25 is slightly greater than the diameter of the solid copper wire 30 so that the solid copper wire 30 can slightly move in the guide groove 25.

Figure 8:
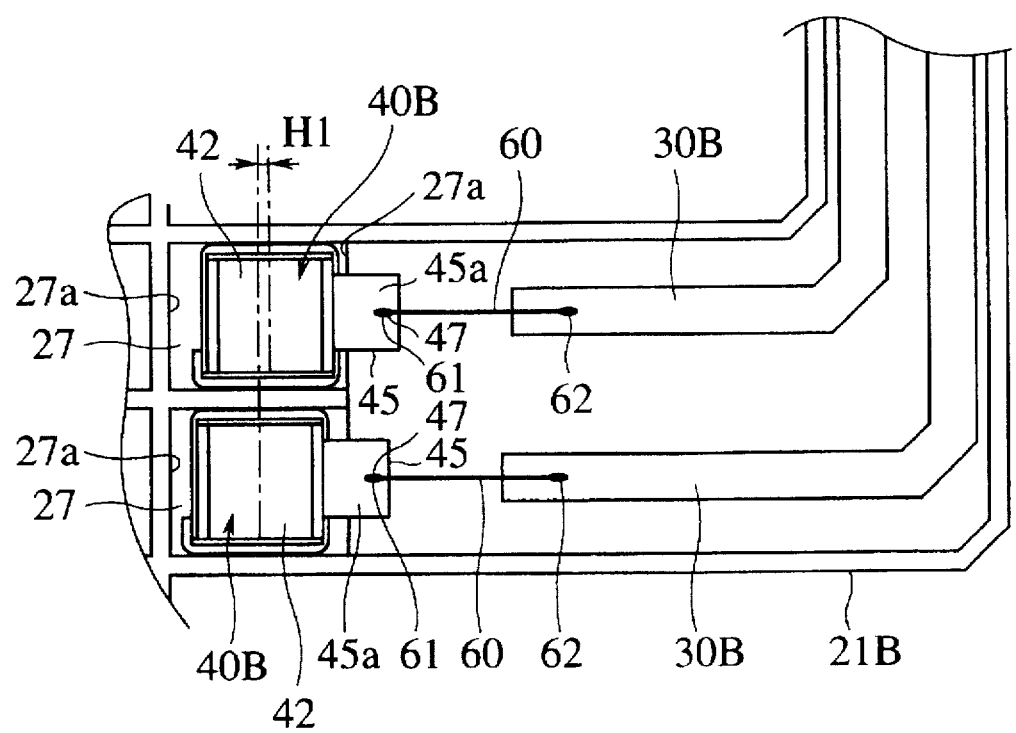
FIG. 8 is an enlarged view of a main structure of the second preferred embodiment of a wiring board for electrical connection according to the present invention, which corresponds to FIG. 4.

As shown in FIG. 8, the female terminal 40 has the wire compressively contacting portion 41 at the central portion in the longitudinal directions, the terminal contacting portion 42 at the front end portion and a wire clamping portion 43 at the rear end portion. The female terminal 40 is formed by folding a sheet metal. The wire compressively contacting portion 41 has a pair of compressively contacting plates 44 spaced in the longitudinal directions so as to be box-shaped. The wire compressively contacting portion 41 is formed on the outer surface of one side portion 45a of a L-shaped folded substrate 45. The wire compressively contacting portion 41 is clamped by a side plate 48 which extends upwards from the side edge of the side portion 45a. Each of the tightly contacting plates 44 is formed with a compressively contacting blade 44a for press-fitting the solid copper wire 30 therein.

The terminal engaging portion 42 is formed on the outer surface of the other side portion 45b of the substrate 45. The terminal engaging portion 42 has a substantially U-shaped cross-section, and has a pair of curved springs 51 therein. That is, the terminal engaging portion 42 comprises a pair of box walls 50, one of which is the other side portion 45b of the substrate 45, a connecting plate 49 for connecting the box walls 50 to each other, and the pair of curved springs 51. The box walls 50, the connecting plate 49 and the curved springs 51 are integral with each other. The curved spring 51 extend inwardly and obliquely upwards from the lower end portions of the box walls 50, respectively, so that the upper-end curved portions 51a of the curved springs 51 contact or approach each other and the lower-end curved portions 51b are spaced. Inclined wall portions 51c are arranged at the middle portions of the curved springs 51. When a tab terminal 71 is inserted into the terminal engaging portion 42 from the bottom in FIG. 3, the outer surface of the tab terminal 71 contacts the curved springs 51 between the inclined wall portions 51c and the upper-end curved portions 51a.

Figure 4:
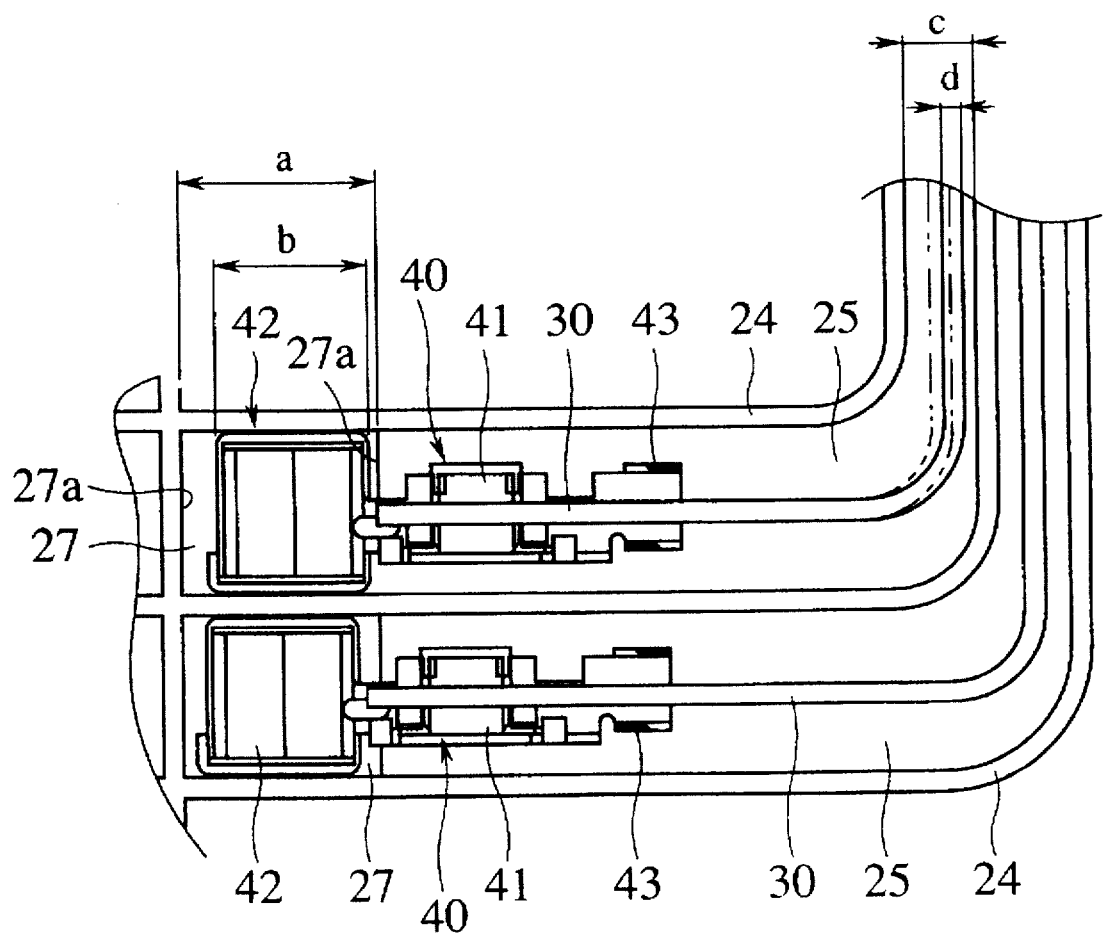
FIG. 4 is an enlarged view of a main portion of the wiring board of FIG. 2.

As shown in FIGS. 4 through 7, the female terminal 40 is received in a recessed portion 27 formed in the base plate 21. The female terminal 40 is arranged so that the central portion of the terminal engaging portion 42 corresponds to a rectangular inserting hole 28 formed in the bottom of the recessed portion 27. The inside dimension of the recessed portion 27 is greater than the outside dimension of the terminal engaging portion 42, and the outside surface of the terminal engaging portion 42 faces side walls 27a of the recessed portion so as to ensure a suitable gap between the outside surface of the terminal engaging portion 42 and the side walls 27a of the recessed portion 27 so that the female terminal 40 can slightly move in the recessed portion 27. That is, as shown in FIG. 4, assuming that the width of the recessed portion is a, the width of the terminal engaging portion 42 of the female terminal 40 being b, the width of the guide groove 25 in the moving directions being c, and the diameter of the solid copper wire 30 being d, the value (a-b) is set to be substantially equal to the value (c-d) and these values are set to be slightly greater than an allowable deviation of the tab terminal 71.

Figure 5:
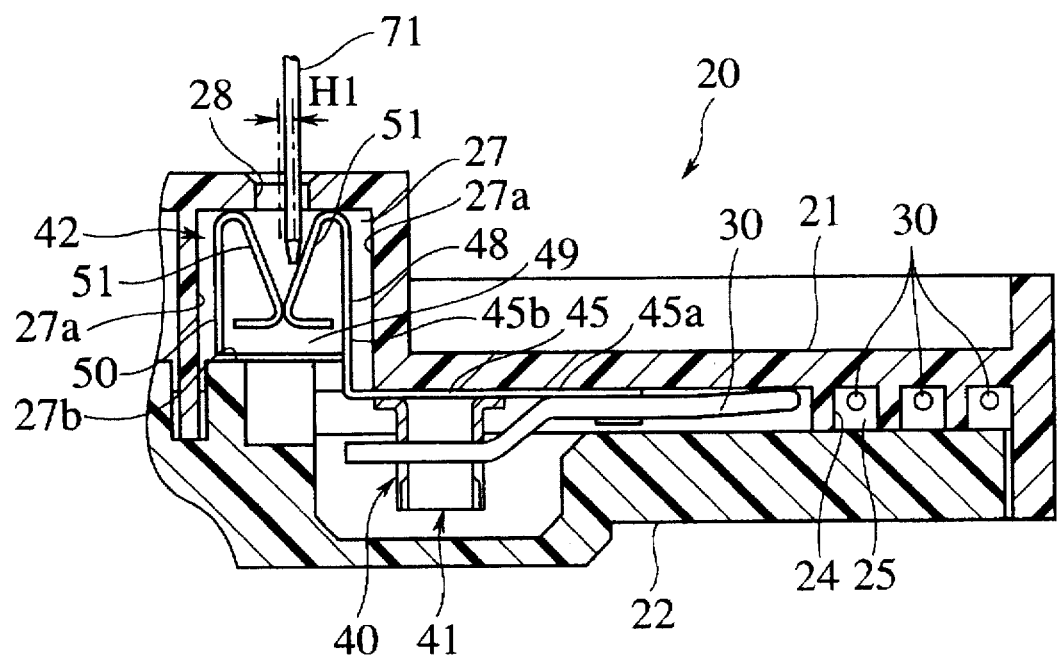
FIG. 5 is an enlarged sectional view of portion V of FIG. 1, which illustrates the state that a tab terminal is inserted into a terminal engaging portion of the female terminal while the tab terminal is shifted from the center of the terminal engaging portion.
Figure 6:
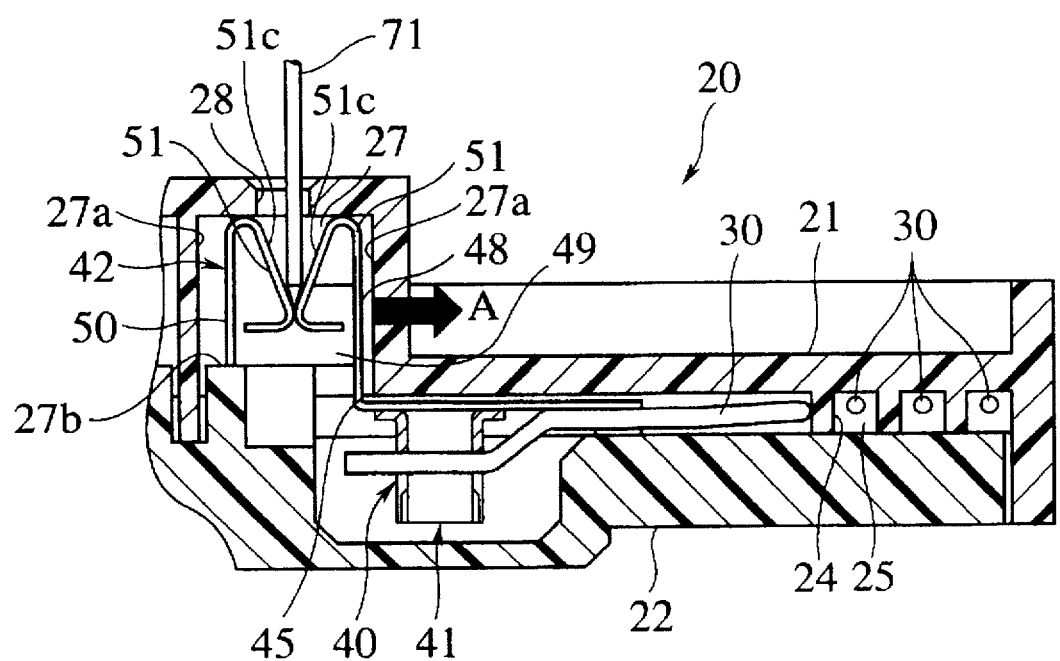
FIG. 6 is an enlarged sectional view of portion V of FIG. 1, which illustrates the next stage to the state of FIG. 5.
Figure 7:
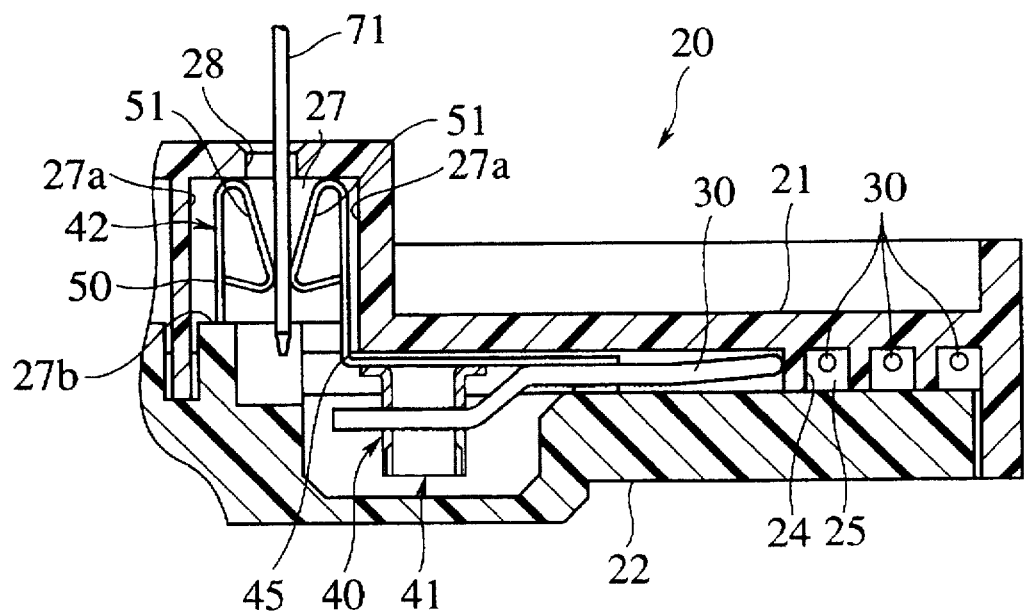
FIG. 7 is an enlarged sectional view of portion V of FIG. 1, which illustrates the next stage to FIG. 6.

In addition, as shown in FIGS. 5 through 7, the recessed portion is provided with a supporting wall 27b for restraining the terminal engaging portion 42 from moving in the opposite direction to the inserting direction of the tab terminal 71 when the terminal engaging portion 42 of the female terminal 40 is received in the recessed portion 27. This supporting wall 27b is formed on the end surface of the projecting wall of the cover 22.

Thus, since the terminal engaging portion 42 is surrounded by the side walls 27a and the supporting wall 27b in the recessed portion 27, the terminal engaging portion 42 is surely held in a predetermined range, i.e. at a position at which the tab terminal 71 can be surely received therein, while permitting necessary and sufficient looseness. In addition, since the terminal engaging portion 42 is provided on the side portion 45b of the L-shaped substrate 45, it is possible to ensure a sufficient depth with respect to the recessed portion 27, so as to enhance the stability when the tab terminal 71 is inserted therein.

When the wiring board 20 for electrical connection is assembled, the solid copper wires 30 are so arranged as to be adapted to the female terminal 40 to be connected thereto, and both ends of each of the solid copper wire 30 are compressively brought into contact with the female terminal 40. In this case, since the internal circuit can be formed by only compressively contacting the solid copper wire with the female terminal 40, the assembling is simple. In addition, it is possible to easily cope with the design change of the circuit by changing the wiring route and length of the solid copper wire 30. Moreover, since the solid copper wires 30 are received in the guide grooves 25 of the base plate 21, the wiring can be easily performed and it is difficult to cause useless looseness. Then, after the internal circuit is formed, the cover 22 covers the surface of the base plate 21 to be secured thereto.

Then, when the wiring board 20 is incorporated into the casing of the automatic transmission, the solenoid valves 15 and the tab terminals 71 of the connector 70 are inserted into the female terminals 40. In this case, when the tab terminal 71 is shifted from the center of the terminal engaging portion 42 of the female terminal 40 by, for example, H1 as shown in FIG. 5, the tip of the tab terminal 71 strikes the inclined wall portion 51c to move the terminal engaging portion 42 in the direction of arrow A as shown in FIG. 6. Finally, the tab terminal 71 is received in the female terminal 40 at the inserted position of the tab terminal 71 to be connected to the female terminal 40. Therefore, it is possible to surely connect the tab terminal 71 to the female terminal 40 while absorbing the deviation of the tab terminal 71 from the terminal engaging portion 42. In addition, since the solid copper wire 30 can move in the guide groove 25 in accordance with the movement of the terminal engaging portion 42, it is possible to easily absorb the deviation of the tab terminal 71.

In addition, since the terminal engaging portion 42 is supported on the supporting wall 27b when the tab terminal 71 is inserted into the terminal engaging portion 42, it is possible to easily and surely insert the tab terminal 71 into the terminal engaging portion 42.

Thus, it is possible to simply connect the dispersed solenoid valves 15 to the wire harness by only inserting the solenoid valves 15 and the tab terminals 71 of the connector 70 arranged on the end portion of the wire harness into the wiring board 20 in the direction perpendicular thereto. Therefore, it is possible to easily perform the electrical connection with a simple structure so as to enhance the operation efficiency.

In this wiring boards 20 for electrical connection, since the circuit is formed by connecting the separate female terminals 40 via the copper wires 30, it is possible to enhance the shape accuracy and the positional accuracy unlike the case that the female terminal is formed in the bus bar by press working, and it is possible to enhance the continuous reliability with respect to the tab terminal 71.

Furthermore, in spite of the solid copper wire, a stranded or twisted wire, a covered wire, a bare wire, an enamel wire or the like can be used as the electric wire. Alternatively, the electric wire may be a longitudinal bus bar if it has flexibility on the plane of the base plate 21.

Figure 9:
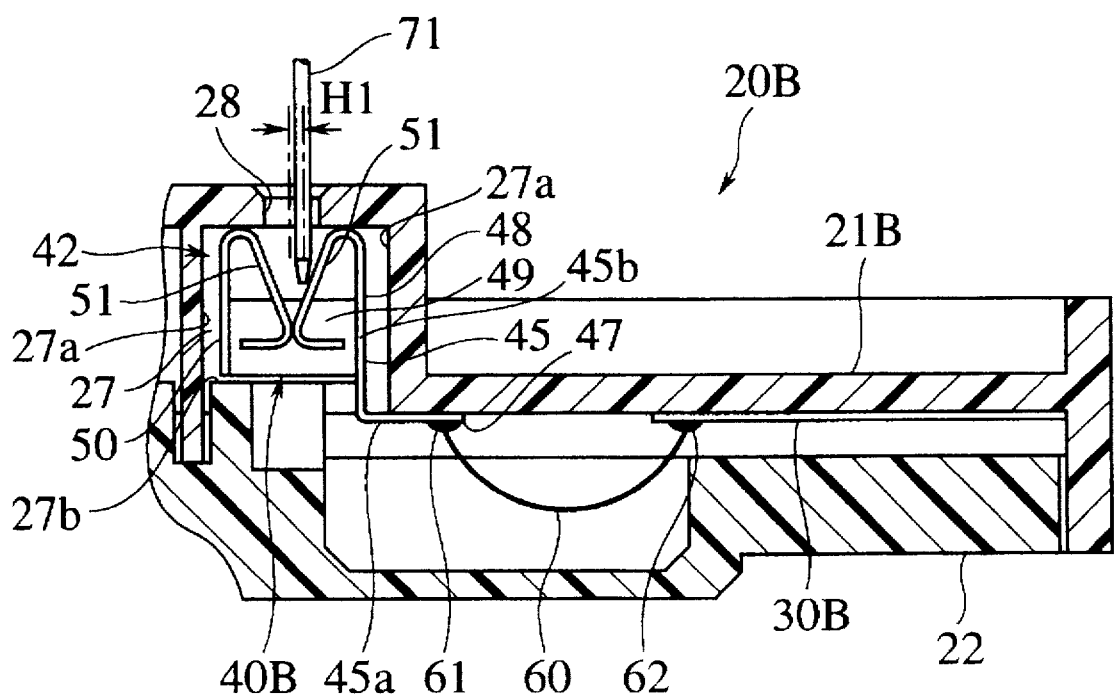
FIG. 9 is an enlarged view of the main structure of the second preferred embodiment of a wiring board for electrical connection according to the present invention, which illustrates the state that a tab terminal is inserted into a terminal engaging portion of the female terminal while the tab terminal is shifted from the center of the terminal engaging portion.

Referring to FIGS. 8 and 9, the second preferred embodiment of a wiring board for electrical connection, according to the present invention, will be described below.

FIGS. 8 and 9 shows a main structure of the second preferred embodiment of a wiring board 20B for electrical connection, according to the present invention. While the solid copper wire (the electric wire) 30 has been used as the circuit member which forms the internal circuit in the aforementioned first preferred embodiment, a bus bar 30B is used as a circuit member in this wiring board 20B for electrical connection, according to the second preferred embodiment.

The bus bar 30B is attached to the bottom surface of the base plate 21 so as to be arranged along a predetermined route. In this case, since the circuit member is not an electric wire, the guide grooves provided on the bottom surface of the base plate 21 for the electric wires in the aforementioned first preferred embodiment are omitted. In addition, since the circuit member is not an electric wire, a female terminal 40B which does not have any wire compressively contacting portions and any wire clamping portions is used.

The female terminal 40B is connected to the bus bar 30B by means of a bonding wire 60 of a thin wire material extending therebetween. As can be clearly seen from FIG. 9, the bonding wire 60 is curved or arched so as to have elasticity. One end 61 of the bonding wire 60 is connected to a wire bonding portion 47 provided on the outer surface of the one side portion 45a of the substrate 45 of the female terminal 40B, and the other end 62 of the bonding wire 60 is connected to the surface of the end portion of the bus bar 30B, so that the female terminal 40B is electrically connected to the bus bar 30B.

Since other structures are the same as those of the wiring board 20 for electrical connection in the first preferred embodiment, the same reference numbers are be used for the same structural portions and the descriptions thereof are omitted.

In this wiring board 20B for electrical connection, the bus bars 30B is used as the circuit members, and the female terminals 40B are manufactured independent of the bus bar 30B. Therefore, it is possible to enhance the dimensional accuracy of the female terminal 40B, particularly the accuracy of the curved spring 51 which is necessary to receive the tab terminal 71 in the female terminal 40B.

In addition, the terminal engaging portion 42 of the female terminal 40B is received in the recessed portion 27 of the base plate 21 while permitting of the movement of the terminal engaging portion 42 in the recessed portion 27, and the female terminal 40B is connected to the bus bar 30B by means of the flexible bonding wire 60. Therefore, similar to the wiring board 20 in the first preferred embodiment, even if the tab terminal 71 of the connector 70 is shifted from the center of the terminal engaging portion 42 of the female terminal 40B when the tab terminal 71 of the connector 70 or the solenoid valve 15 is inserted into the terminal engaging portion 42 of the female terminal 40B, the female terminal 40B can move in accordance with the inserted position of the tab terminal 71, and the tab terminal 71 can be properly connected to the female terminal 40B. That is, the tab terminal 71 can be surely connected to the female terminal 40B while absorbing the deviation of the tab terminal 71 from the axis of the terminal engaging portion 42. In this case, the bonding wire 60 can be bend so as to easily absorb the deviation.

Furthermore, a thin metal strip can be substituted for the aforementioned bonding wire of a thin wire material.

While the bus bar 30B has been used as one of the circuit members in the embodiment as shown in FIGS. 8 and 9, a thin film circuit pattern may be directly formed on the base plate by plating, deposition or the like, to be used as one of the circuit members in spite of the bus bar 30B to be contacted to the female terminal 40B by means of the bonding wire 60.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A wiring board for electrical connection, comprising:

a base plate of an insulating material, said base plate being formed with a plurality of recessed portions;

a cover for covering a surface of the base plate;

a plurality of female terminals, each being received in the corresponding recessed portion of the base plate while being permitted to move in the recessed portion in directions of a major plane of the base plate; and a plurality of circuit members provided between the base plate and the cover, each of the circuit members electrically connecting one female terminal to another female terminal via a flexible conductor.

2. A wiring board for electrical connection as set forth in claim 1, wherein each of said circuit members is an electric wire, and said conductor is a part of the electric wire.

3. A wiring board for electrical connection as set forth in claim 2, wherein said female terminal comprises a bent substrate having an L-shaped cross-section, a wire compressively contacting portion which is formed on an outer surface of one side portion of the substrate and to which an end portion of said electric wire is compressively connected, and a terminal engaging portion formed on an outer surface of the other side portion of the substrate for receiving therein a tab terminal so as to be substantially perpendicular to said base plate, said terminal engaging portion being received in said recessed portion while ensuring predetermined clearances between the outer surface of the terminal engaging portion and the side walls of the recessed portion, and said base plate being covered by said cover while receiving said electric wire in a guide groove formed in the base plate.

4. A wiring board for electrical connection as set forth in claim 3, wherein said guide groove has a width greater than a diameter of said electric wire.

5. A wiring board for electrical connection as set forth in claim 1, wherein said circuit member is a bus bar, and said conductor is a bonding wire which has a spring characteristic and which is bridged between the bus bar and said female terminal.

6. A wiring board for electrical connection as set forth in claim 1, wherein said circuit member comprises a thin film circuit pattern formed on said base plate, and said conductor is a bonding wire which has a spring characteristic and which is bridged between the circuit pattern and said female terminal.

7. A wiring board for electrical connection as set forth in claim 5, wherein said female terminal comprises a bent substrate having an L-shaped cross-section, a wire bonding portion which is formed on an outer surface of one side portion of the substrate and to which an end portion of said bonding wire is connected, and a terminal engaging portion formed on an outer surface of the other side portion of the substrate for receiving therein a tab terminal so as to be substantially perpendicular to said base plate, said terminal engaging portion being received in said recessed portion while ensuring predetermined clearances between the outer surface of the engaging portion and the side walls of the recessed portion.

8. A wiring board for electrical connection as set forth in claim 6, wherein said female terminal comprises a bent substrate having an L-shaped cross-section, a wire bonding portion which is formed on an outer surface of one side portion of the substrate and to which an end portion of said bonding wire is connected, and a terminal engaging portion formed on an outer surface of the other side portion of the substrate for receiving therein a tab terminal so as to be substantially perpendicular to said base plate, said terminal engaging portion being received in said recessed portion while ensuring predetermined clearances between the outer surface of the engaging portion and the side walls of the recessed portion.

9. A wiring board for electrical connection as set forth in claim 3, wherein said base plate has a supporting wall for supporting thereon said terminal engaging portion received in said recessed portion.

10. A wiring board for electrical connection as set forth in claim 4, wherein said base plate has a supporting wall for supporting thereon said terminal engaging portion received in said recessed portion.

11. A wiring board for electrical connection as set forth in claim 7, wherein said base plate has a supporting wall for supporting thereon said terminal engaging portion received in said recessed portion.

* * * * *